United States Patent Office 3,234,037
Patented Feb. 8, 1966

3,234,037
STARCH COMPOSITION
Robert W. Satterthwaite, Brookfield, Ill., assignor to Corn Products Company, New York, N.Y., a corporation of Delaware
No Drawing. Filed Sept. 28, 1961, Ser. No. 141,288
3 Claims. (Cl. 106—210)

This invention relates to the production of an improved starch binder composition. More particularly, it relates to the production of a starch binder comprising a thick-boiling starch and a polyhydric alcohol fatty acid ester.

The starch binder of my invention, when gelatinized, has a greater viscosity and a greater viscosity stability than other starches, and is therefore particularly suitable for use in the manufacture of acoustical ceiling tile and other tile products made from a mixture of water, gypsum, mineral wool and other ingredients. Starch and starch products have been used for many years as adhesives to bind together the various ingredients of the tile to form a plastic mass. The resulting plastic mass is then formed into a sheet, after which it is scored, dried in an oven, and processed for sale.

The starch products most commonly used as binders in the tile making process are the so-called thick-boiling starches, i.e. unmodified starches obtained directly from the wet milling process. These starches are inexpensive and have sufficient adhesive properties to be useful in the tile industry. Super-thick boiling starches have been made from the thick-boiling starches, for example, by chemical modification. Such products, when cooked, form heavier bodied pastes than those from untreated starches. These super-thick boiling starches also have the ability to absorb and retain more water than unmodified starches. Because of these characteristics, when pastes of these products are mixed with the tile mass, they increase the wet tile strength and reduce the time required to dry the tile.

However, this method of manufacture using conventional thick-boiling starches or super-thick boiling starches as binders is time-consuming and expensive because of the high percentage of partially dried tile which is obtained after the usual drying operation, and which must be submitted to a redrying operation.

I have found a method for overcoming these disadvantages and for improving the properties of the resulting tile by adding to the tile mix a composition consisting of a super-thick boiling starch and a polyhydric alcohol fatty acid ester. My composition is made by first treating a starch in a manner which is described hereinafter in an aqueous system at a temperature below its gelatinization temperature to reduce the tendency for the starch granules to swell when heated in an aqueous medium. Then the ester is added and the resultant product is filtered and washed and dried by conventional means. The addition of my composition to the tile mix results in a reduction in drying time and a great reduction in the amount of wet tile produced so that the rate and economy of production are increased because of the faster drying rate of the tile and the elimination of sub-standard tile which requires reprocessing. In addition, the finished tile shows increased wet strength, increased density and increased resistance to warp or sag.

Any super-thick boiling starch may be used in my composition provided the starch has a Scott viscosity of at least 60 seconds based on 11 grams of starch. The super-thick boiling starch which I use in my composition may be made by treating corn starch in aqueous slurry or in the dry state with halogens, halogenated compounds or other similar reagents. The increase in the apparent body of the starch when cooked in water is measured most readily by the Scott viscosity test which is described on page 119 of "Chemistry and Industry of Starch" by Ralph W. Kerr. Other methods of making a super-thick boiling starch product include treating the starch in aqueous alkali slurry with reagents such as epichlorohydrin, phosphorus oxychloride, cyanuric chloride, sodium trimetaphosphate and formaldehyde or others which form cross-links between the starch molecules. Any of these methods may be used to produce a starch product which has from at least 2 to more than 10 times the viscosity of the original unmodified starch as measured by the Scott test.

The procedure which I prefer to use to make super-thick boiling starch is described in U.S. Patent 2,108,862, dated February 22, 1938. This procedure comprises preparing a starch slurry having a density of 20–22° Bé., at 60° F., and adjusting the pH to 3.6–3.7 with dilute hydrochloric acid. Sodium hypochlorite is added to the aqueous slurry to provide 0.5 percent available chlorine based on starch, dry basis, and the pH is maintained at 3.6–3.7 for 1–1.5 hours. An aqueous solution of sodium bisulfite (0.15 percent based on starch, dry basis) is added and the slurry is adjusted to a pH of 5.0 with a 15° Bé. sodium carbonate solution. The resulting slurry is filtered and the product is washed and dried to 10–12 percent moisture. My invention is not restricted to corn (maize) starch since tapioca, potato, and other commercially available starches are also suitable.

The polyhydric alcohol fatty acid ester is added to the super-thick starch in amounts varying from 0.1 to 1 percent based on starch, dry basis, but I prefer to have about 0.5 percent of the ester present in the composition. The ester may be added during the manufacture of the super-thick starch by adding it directly to the slurry during the treatment of the starch, or it may be added to the slurry of the starch product after treatment, but prior to washing of the starch product or after the starch has been dried. The ester may also be added to the starch product after the starch has been completely processed, or the ester may be added to the tile mixture in which the starch product is to be used.

Of the polyhydric alcohol fatty acid esters that can be used in my invention, I prefer to use the laurate, stearate, or palmitate ester of diglycol. I prefer to use the liquid form of such products but the so-called wax-like products with ethylene linkages of about 2 to over 100 may also be used.

A comparison of some of the properties of my starch composition with the properties of super-thick boiling starch and thick-boiling starch is found in Table I.

The following method was used to determine the viscosity stability of the products described in Table I. Fifty-five grams of starch were slurried in water containing 7 grams of boric acid and the total weight was adjusted to 1000 grams. The slurry was agitated and heated to 200° F. in a Corn Industry Viscometer (CIV). The viscosity (in gram centimeters) was recorded at various time intervals, keeping the temperature constant. The data are summarized in Table II.

Table I

|  | Super-Thick Boiling Corn Starch-Ester Composition | Super-Thick Boiling Corn Starch | Thick-Boiling Corn Starch |
|---|---|---|---|
| Form | Starch Powder | Starch Powder | Starch Powder. |
| Color | White | White | White. |
| Odor | No Foreign | No Foreign | No Foreign. |
| Microscopic | Ungelatinized Corn Starch Granules. | Ungelatinized Corn Starch Granules. | Ungelatinized Corn Starch Granules. |
| Scott Viscosity | 11 gm.—70 sec | 11 gm.—65 sec | 12 gm.—70 sec. |
| pH | 5.0–6.0 | 5.0–6.0 | 4.7–5.1. |
| $CCl_4$ Extractables, percent | 0.5 | 0.0 | 0.0. |
| Swelling Power Index | 12–14 | 11–12 | 11.0. |
| Solubles Percent Average | 22 | 30 | 45. |

Table II
Viscosity in gram-centimeters

| Heating Time, Minutes | Super-Thick Boiling Starch-Ester Composition | Super-Thick Boiling Starch | Thick-boiling Starch |
|---|---|---|---|
| 10 | 160 | 130 | 150 |
| 15 | 205 | 160 | 144 |
| 30 | 184 | 140 | 120 |
| Percent Loss in Viscosity from Peak | 10 | 13 | 20 |

The above results show that my composition containing the ester not only has a greater viscosity but also has relatively greater viscosity stability on prolonged cooking than the thick-boiling starches which do not contain the ester.

In a preferred embodiment my invention comprises mixing about 0.55 percent (based on starch) of a polyhydric alcohol fatty acid ester such as diethylene glycol mono-laurate by spraying it onto a super-thick boiling starch in dry form. The resulting composition is added to a tile mix consisting of water containing gypsum and boric acid and paraffin wax, and heated to 200° F. The mixture is diluted with water and cooled and then the mineral wool is added and the mixture is blended and formed into sheets. The tile is then cut into sections, dried in an oven, cooled, cut, and processed for sale.

The above procedure was followed except that the amount of diethylene glycol mono-laurate was varied. The results of these experiments are tabulated in Table III and show that the addition of 0.5 percent of a diethylene glycol mono-laurate reduced the drying time of the tile and produced no wet tile, thereby eliminating the need for a redrying step.

Table III

| Starch Type | I | I | I | I | II | II |
|---|---|---|---|---|---|---|
| Percent diethylene Glycol Mono-laurate | None | 0.25 | 0.5 | 1.0 | None | 0.5 |
| Tile Drying Time (Minutes) | 17.625 | 17.625 | 17.5 | 17.5 | 17.625 | 17.5 |
| Percent Wet Tile | 30–60 | 14–25 | None | None | 81–100 | None |

Starch type I is a super-thick boiling starch made according to the preferred procedure given in this application.
Starch type II is a super-thick boiling starch made according to the process outlined in this application except that formaldehyde was used as the cross-linking agent instead of sodium hypochlorite.

Substantially the same results are obtained when other fatty acid esters are used instead of diethylene glycol mono-laurate. Polyoxyethylene mono-stearate, glycerol mono-stearate and sorbitan mono-stearate produce essentially the same results as diethylene glycol mono-laurate.

In addition to the high viscosity and improved viscosity stability, my starch binder composition has improved film forming characteristics, better binding properties and is less soluble when cooked in an aqueous system than conventional starches.

When used in tile making, my starch composition improves the wet tile characteristics, increases the wet tile strength and density, and increases the resistance to sag or warp.

I claim:

1. A starch composition which becomes a binder upon gelatinization of said starch comprising a thick-boiling starch having a Scott viscosity of at least 60 seconds for 11 grams of starch and from about 0.1 to about 1 percent, based on starch, dry basis, of diethylene glycol mono-laurate.

2. A starch composition which becomes a binder upon gelatinization of said starch comprising a thick-boiling corn (maize) starch having a Scott viscosity of at least 60 seconds for 11 grams of starch and from about 0.1 to about 1 percent, based on starch, dry basis, of diethylene glycol mono-laurate.

3. A starch composition which becomes a binder upon gelatinization of said starch consisting essentially of a thick-boiling starch having a Scott viscosity of at least 60 seconds based on 11 grams of starch; and from about 0.25 to about 1%, based on starch, dry basis, of a polyhydric alcohol fatty acid mono-ester; said fatty acid containing from 12 to 18 carbon atoms.

References Cited by the Examiner

UNITED STATES PATENTS

| 2,108,862 | 2/1938 | Kerr | 106—210 |
| 2,876,125 | 3/1959 | Miley | 106—211 |
| 2,913,359 | 11/1959 | Pollock et al. | 127—33 XR |
| 3,066,036 | 11/1962 | Curtin | 106—213 |
| 3,074,803 | 1/1963 | McGowan | 106—38.5 |
| 3,090,699 | 5/1963 | Bulson | 117—165 |

OTHER REFERENCES

Ralph W. Kerr: "Chemistry and Industry of Starch," Academic Press Inc., second ed. (N.Y.), 1950.

ALEXANDER H. BRODMERKEL, *Primary Examiner.*

JOSEPH REBOLD, *Examiner.*